Oct. 30, 1962   W. A. GROVES   3,061,219
PROJECTOR
Filed April 17, 1959   4 Sheets-Sheet 1
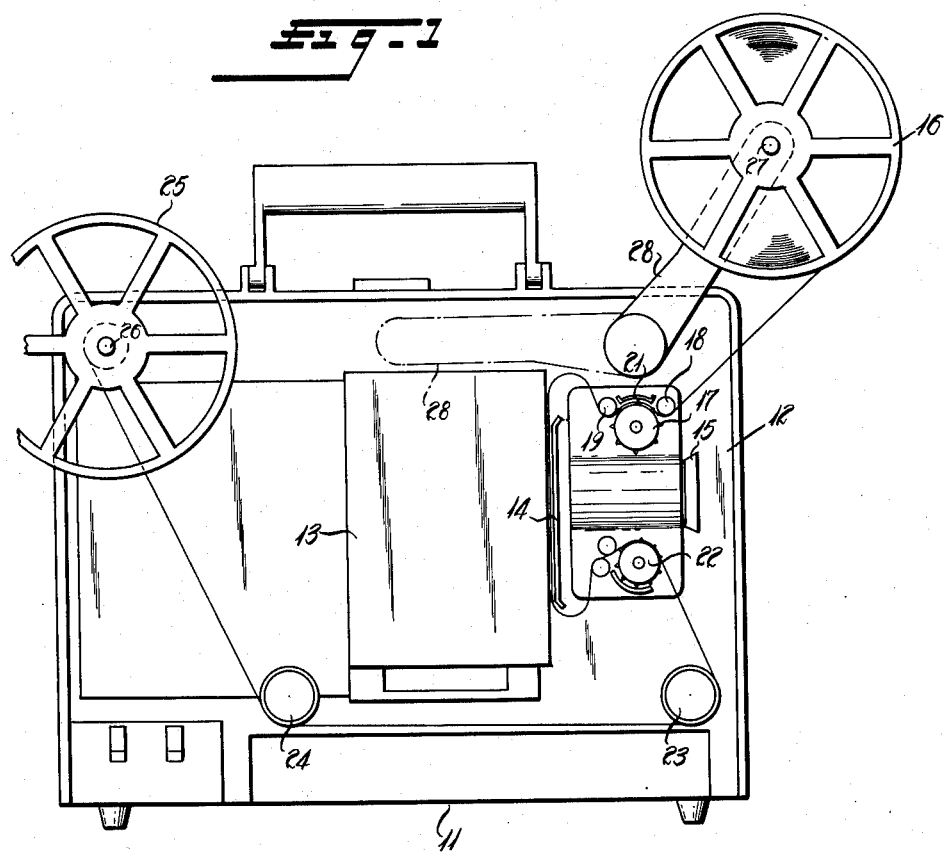
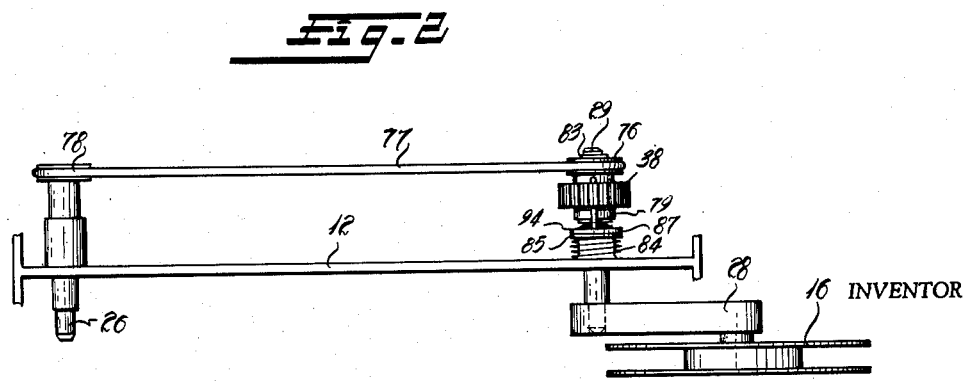
INVENTOR
WILLIAM A. GROVES
BY
ATTORNEYS Oct. 30, 1962  W. A. GROVES  3,061,219
PROJECTOR
Filed April 17, 1959  4 Sheets-Sheet 2
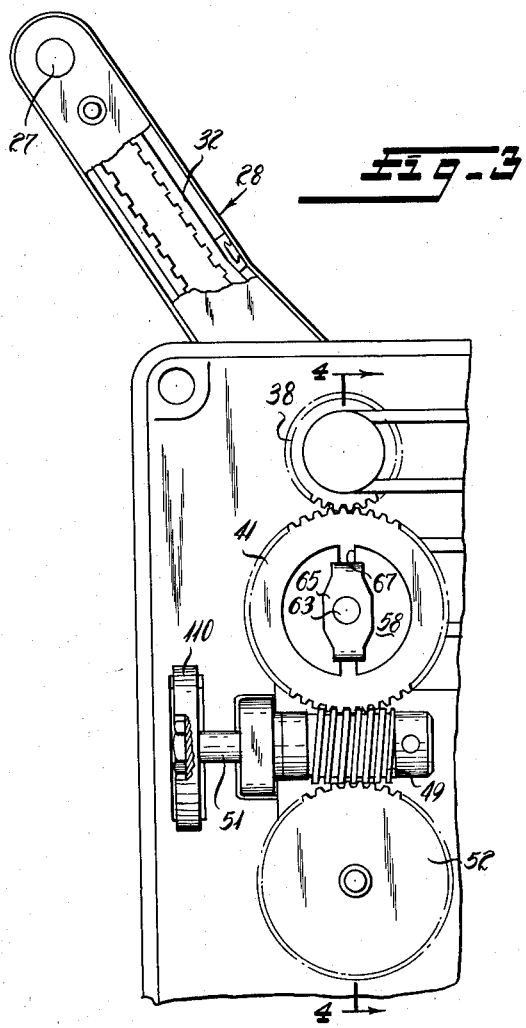
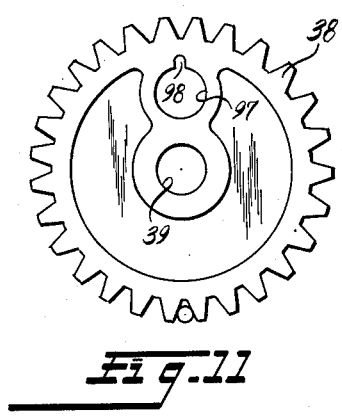
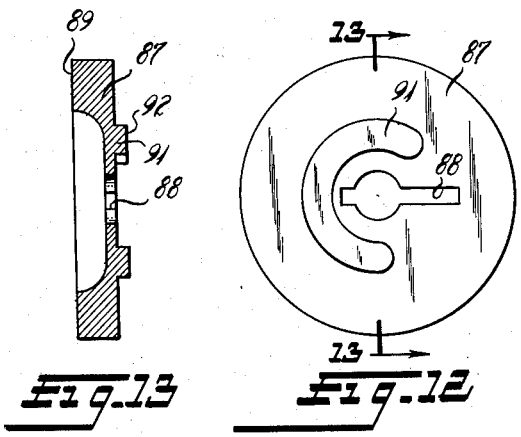
INVENTOR
WILLIAM A. GROVES
BY
ATTORNEYS INVENTOR
WILLIAM A. GROVES
BY Strauch, Nolan & Neale
ATTORNEYS

United States Patent Office 3,061,219
Patented Oct. 30, 1962

3,061,219
PROJECTOR
William A. Groves, Ann Arbor, Mich., assignor, by mesne assignments, to Argus Incorporated, a corporation of Delaware
Filed Apr. 17, 1959, Ser. No. 807,099
16 Claims. (Cl. 242—55.12)

This invention relates to motion picture projectors and particularly to special drive arrangements.

In its preferred embodiment the invention will be described as incorporating an automatic reversible clutch arrangement for normal projection drive and rewind drive in a motion picture projector. The clutch in this embodiment has its input connected to the main drive mechanism of the projector and its output is automatically connected to drive one or the other of the take-up or supply reel spindles depending on the direction of the main drive.

It is the major object of the invention to provide a novel automatically reversible drive mechanism that is particularly suited for motion picture drive.

Another object of the invention is to provide a novel projection and rewind drive system in a motion picture projector that includes a special automatically reversible clutch assembly.

It is a further object of the invention to provide a novel drive system in a motion picture projector wherein sprockets above and below the film gate are driven by a main drive shaft and the drive to the supply and take-up reels is connected to the main drive by a special automatically reversing clutch mechanism.

A further object of the invention is to provide a novel clutching arrangement coaxial with the upper sprocket in a motion picture projector.

It is a further object of this invention to provide a novel reversible clutch assembly wherein an input member capable of being reversibly driven is automatically connected to one or the other of two output members for unidirectional drive of the latter.

It is a further object of the invention to provide a novel reversible unidirectional clutch arrangement wherein an intermediate gear or like member is capable of being reversely driven and wherein a pawl carried by the gear is automatically rocked in one direction or the other depending on the direction of rotation of the gear to connect the gear for unidirectional drive to one or another output ratchet member, which latter may be operatively connected respectively to the supply and take-up spindles of a motion picture projector.

Further objects will presently appear as the description proceeds in connection with the attached claims and the annexed drawings wherein:

FIGURE 1 is a side elevation of a motion picture projector in which the invention is incorporated;

FIGURE 2 is a top plan view of the projector of FIGURE 1 showing the reel drive;

FIGURE 3 is a fragmentary side elevation showing the opposite side of the drive from FIGURE 1;

FIGURE 11 is a side elevation of the clutch gear;

FIGURE 12 is a front elevation of the clutch annulus of the pawl control; and

FIGURE 13 is a section on line 13—13 of FIGURE 12.

Figure 4:
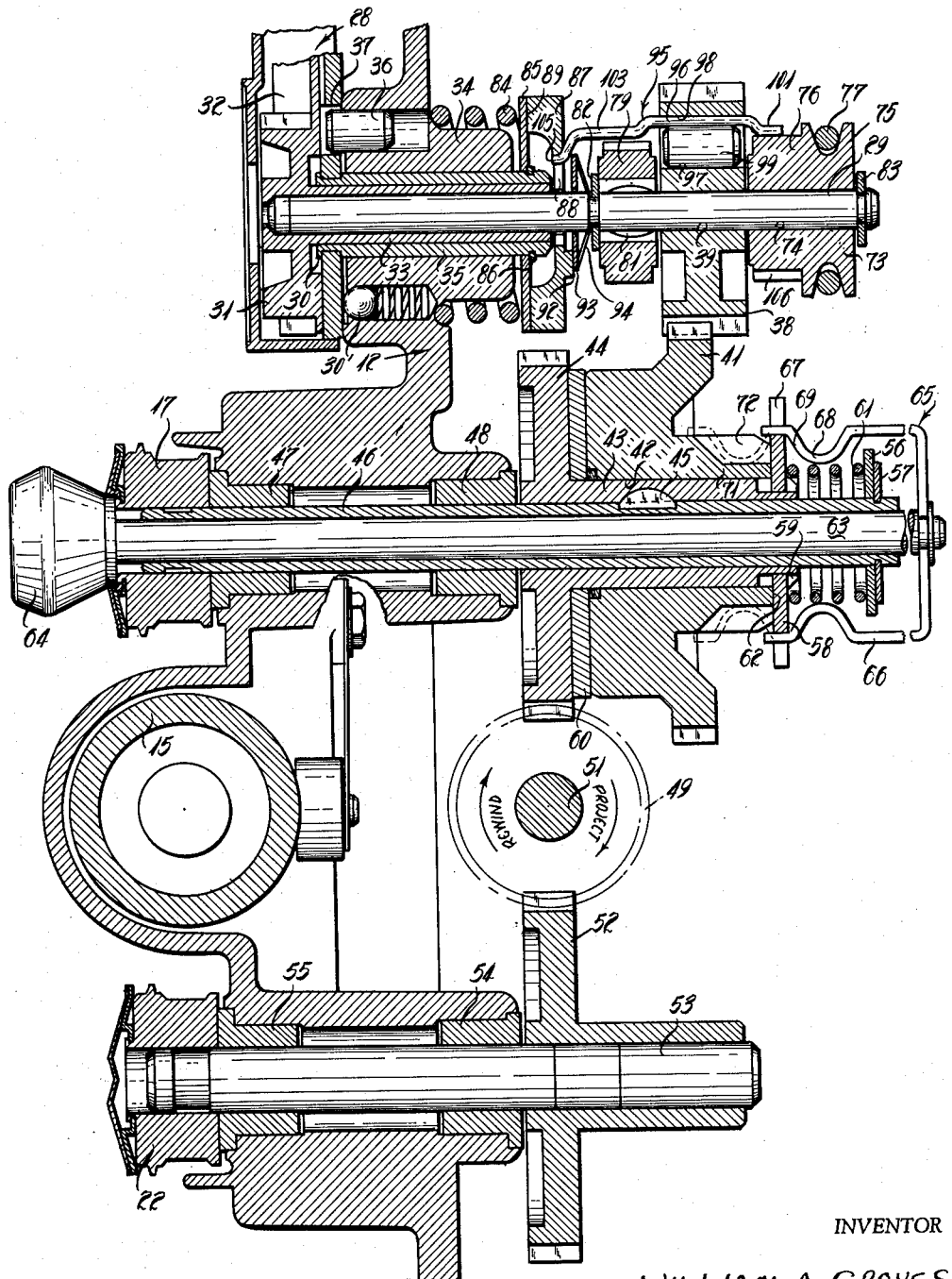
FIGURE 4 is an enlarged section taken on line 4—4 of FIGURE 3.
Figure 5:
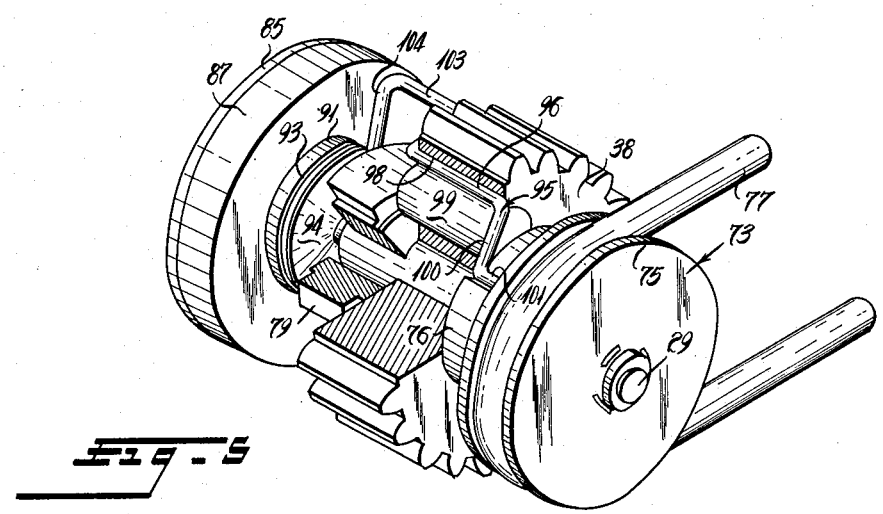
FIGURE 5 is an enlarged perspective view of the rewind clutch assembly.
Figure 6:
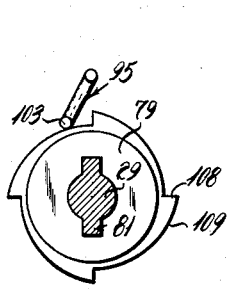
FIGURE 6 is a section through the clutch assembly illustrating the special pawl and ratchet action.

The invention is illustrated as incorporated in a motion picture projector having a base 11 from which upstands a rigid plate 12 on which essentially all of the projector parts are mounted. A projector lamp assembly 13 is mounted on plate 12 in optical alignment with a projection aperture in a film gate 14 and with a projection objective lens 15.

A film F to be projected is drawn from a rotatable supply reel 16 by a continuously driven upper sprocket 17, being guided by fixed axis idler rollers 18, 19 on the plate and a fixed arcuate guide shoe 21. The film is intermittently moved through the film gate by a suitable intermittent claw type feed (not shown) and then fed over and by a continuously driven lower toothed sprocket 22.

After leaving sprocket 22 film F passes under rotatable guide rollers 23 and 24 beneath the lamp house and up to a take-up reel 25 removably secured on a rotatable take-up spindle 26 journalled in plate 12.

Reel 16 is removably mounted on a supply spindle 27 journalled in the upper end of a hollow arm 28 that is pivoted on the same side of plate 12 as the film gate to rock about the axis of a stub shaft 29 carrying a drive sprocket 31 (FIGURE 4) connected within arm 28 by belt or chain 32 (FIGURE 3) with a similar drive sprocket (not shown) fixed on spindle 27.

Sprocket 31 is supported by an elongated hub 33 that extends through and is journalled in a boss 34 on plate 12 by an axially fixed rotatable sleeve bushing 35 of bearing material. The left end of sleeve 35 as shown in FIGURE 4 is preferably staked over at 30 to become affixed to arm 28. Preferably hub 33 is press fitted tightly on shaft 29. Rocking movement of arm 28 is limited between the full and dotted line positions of FIGURE 1 by a fixed pin 36 on plate 12 coacting with an arcuate slot 37 of suitable length on arm 28. A suitable ball and detent device indicated at 30' may be used to hold arm 28 in either position.

A clutch gear 38 has a smooth cylindrical bore 39 by which it is freely rotatably mounted on shaft 29 on the opposite side of plate 12 from arm 28. Gear 38 is meshed with a gear 41 that has a cylindrical bore 42 journalled on the hub 43 of a gear 44 fixed non-rotatably, as by a key 45, upon a sleeve 46 that is rotatably supported in bushings 47 and 48 on plate 12.

Gear 44 in turn is meshed with a worm 49 on the main drive shaft 51 which is suitably connected to a drive motor (not shown) and worm 49 is also meshed with gear 52 non-rotatably mounted on one end of a shaft 53 supported on bushings 54 and 55 in plate 12 and non-rotatably carrying the lower film sprocket 22.

As shown in FIGURE 4 sleeve 46 projects axially beyond the end of gear hub 43 and carries an axially slidable washer 56 abutting an axially fixed snap ring 57. A larger flat washer 58 is axially slidably and non-rotatably mounted on the outer end of sleeve 46, as by splines 59 on the sleeve and coacting teeth on the inner bore of the washer, and a coiled compression spring 61 urges washer 58 against the flat smooth radial face 62 of gear 44. A flat-sided slip clutch washer 60 of friction material surrounds hub 43 to provide a slip clutch connection between gears 41 and 44 which are urged into contact with opposite sides of the clutch washer by spring 61.

A clutch rod 63 is axially slidable within sleeve 46, being formed with a manual knob 64 where it projects through sprocket 17. Sprocket 17 is fixed on rod 63 and axially slidable on sleeve 46. At its inner end rod 63 has fixed thereon a shift yoke 65, trapped between a shoulder and a snap ring. Yoke 65 has parallel spring arms 66 extending longitudinally and each formed with a similar inwardly bowed section 68 near its inner end and where the arms 66 project through diametrically opposite edge recesses 67 of washer 58.

In the full line condition shown in FIGURE 4, rotation of gear 44 is now transmitted to gear 41, the friction washer 60 providing a clutch capable of transmitting the required torque to drive the gear and drive sprocket mechanism above it. The inclined surfaces 69 on each yoke arm 66 bear on the adjacent edges of recesses 67 to prevent accidental movement of rod 63 to the left in FIGURE 4, and yoke 65 in effect thus acts to maintain the rod 63 in its FIGURE 4 position.

Rod 63 is in the FIGURE 4 position during normal projection of pictures when film is being continuously pulled off reel 16 by the sprocket 17, the spindle 27 thus being disconnected from positive drive at the time, and the friction washer 60 aiding to prevent overrun of the reel by effectively braking the spindle drive mechanism.

As shown in FIGURE 4 the outer end of hub 71 of gear 41 is formed with diametrically opposite slots 72 into which the bowed arm sections 68 of yoke 65 spring when the rod 63 is pulled to the left in FIGURE 4. This condition is shown in dotted lines in FIGURE 4 and it is the condition of the parts when film is being rewound on the supply reel 16. At that time shaft 51 is driven reversely and gear 41 is now positively clutched to gear 44 by yoke 65 and washer 58, so that a positive drive is now transmitted to gear 38.

A combined pulley and ratchet member 73 has a smooth bore 74 by which it is freely rotatable on shaft 29, and it comprises a pulley section 75 and a wind ratchet section 76. A drive belt 77 extends from pulley 75 to a pulley 78 on take-up spindle 26.

At the other side of gear 38 a rewind ratchet 79 is secured on shaft 29 as by keys at 81. Spring washers 82 and 83 axially fixed in suitable grooves on shaft 29 maintain the parts in axially assembled relation.

With reference to FIGURE 4 plate boss 34 externally supports a strong coiled compression spring 84 that reacts between plate 12 and a flat clutch washer 85 rotatable and slidable with respect to bushing 35 but axially stopped by a ring 86 seated in a groove in the bushing.

A clutch annulus 87 molded of Bakelite or like plastic surrounds shaft 29 (FIGURE 12) and is formed with a radial key slot 88 that is elongated at one side of the diameter. One side of annulus 87 is a flat smooth face 89 engaging washer 85, and at the other side is formed an arcuate sector boss 91 having a flat face 92 normal to the shaft axis. A friction washer 93 surrounds the shaft 29 in contact with face 92, and a bowed annular plate spring 94 is axially compressed between washer 92 and stop washer 82. Spring 94 axially urges clutch washer 87 against washer 85.

Figure 8:
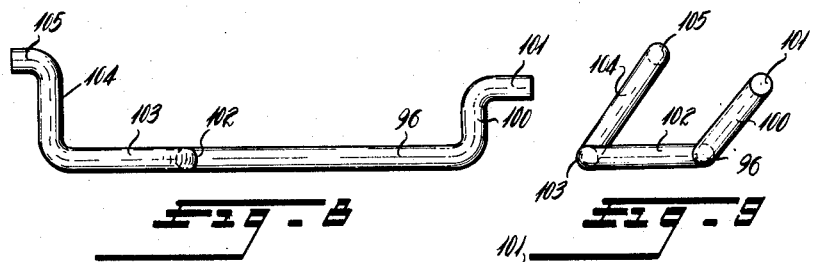
FIGURES 8, 9 and 10 are side, top and end views respectively of the pawl element of the clutch assembly.
Figure 9:
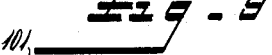
Figure 10:
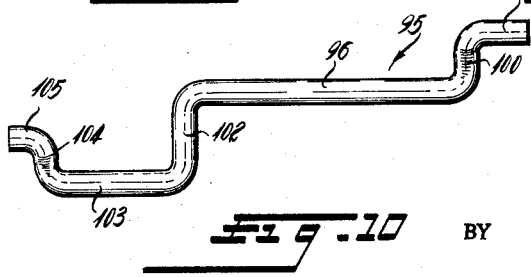

A clutch pawl 95 of special shape as shown in FIGURES 8–10 is mounted to automatically clutch gear 38 in drive connection with either ratchet 76 or ratchet 79 depending on the direction that gear 38 is driven.

Pawl 95 is formed of a single length of metal, preferably round wire, and has an intermediate section 96 journalled freely in extending through gear 38. As shown in FIGURE 11, gear 38 is formed with an offset cylindrical bore 97 parallel to bore 39 and one side of the bore 97 has a longitudinal groove 98 sized to receive and journal pawl section 96. A pin 99 is driven into bore 97 (FIGURE 4) so that effectively the pawl 95 is retained on gear 38.

At one end the pawl 95 is bent at right angles to provide an arm 100 extending past the side of the gear and again at right angles to provide arm 101 parallel to but offset from section 96 adapted to coact with wind ratchet 76. At the other side of gear 38 the pawl 95 is bent to provide in succession an arm 102 extending at right angles past the side of the gear 38, an arm 103 extending parallel to section 96 but radially offset therefrom with respect to the axis of shaft 29, an arm 104 extending perpendicularly to arm 103 and being of about the same length as arm 103, and a terminal arm 105 that is parallel to section 96 but offset therefrom and projects into the slot 88 of clutch washer 87.

Figure 7:
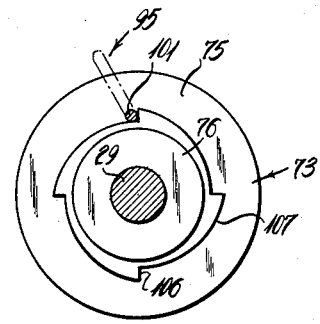
FIGURE 7 is another section through the clutch assembly further illustrating the special pawl and ratchet action.

As shown in FIGURE 7 ratchet 76 has on its periphery a plurality of radial drive faces 106 with circumferentially spaced arcuate faces 107 that rise gradually from the root of one drive face to the tip of the next. Faces 106 are equidistant and face in the same direction. As shown in FIGURE 8 ratchet 79 has a plurality of radial drive faces 108 spaced circumferentially by smooth gradually rising arcuate surfaces 109. Faces 108 all face in the same direction, and oppositely from faces 106 of the ratchet 76.

With the parts in the full line position of FIGURE 4 and with main shaft 51 rotating clockwise as the full line arrow shows, gear 44 will be driven clockwise as shown in FIGURE 3, thereby rotating clutch gear 38 counterclockwise through clutch 60 and gear 41. The pawl 95 will be carried around with gear 38 but the end of the pawl at 105 is trapped rotatably in slot 88. Therefore pawl 95 will rock on section 96 until arm 101 engages ratchet 76 and abuts a face 106 to positively drive pulley assembly 73 which through belt 77 drives the take-up spindle 26.

During drive of the take-up spindle the pawl arm 103 is disposed out of contact with ratchet 79, having been rocked to that position by movement of the pawl, so that gear 38 does not drive the supply spindle drive sprocket 31. Clutch washer 87 rotates around shaft 29 with the pawl 95 and gear 38 assembly.

It will be noted that the foregoing clutching action does not require axial movement of gear 38 which remains substantially axially fixed while rotating in either direction.

When it is desired to rewind film on the supply reel 16, the operator reverses the direction of drive of shaft 51 by a suitable control (not shown) and pulls out knob 64 until yoke 65 clutches gear 41 and 44 positively together as above explained. The film is now extended directly from the reel 25 to reel 16.

Now clutch gear 38 is rotated clockwise, and drag of the pawl end at 105 causes rocking of the pawl 95 about section 96 to lift arm 101 out of drive contact with ratchet 76 and at the same time rock arm 103 inwardly to engage ratchet 79 and abut a drive face 108 to provide a positive drive connection rotating ratchet 79 and shaft 29 which is fixed to ratchet 79. This drives the supply spindle 27 and the drive to spindle 26 is automatically disconnected.

While clutch annulus 87 rotates with the gear 38 in either direction, the drag provided by the spring biased friction clutch at 85, 87 is sufficient to assure the automatic rocking of pawl 95 with a change in direction of rotation of gear 38.

A knurled hand wheel 110 is mounted on shaft 51 for use optional to motor drive of the shaft during threading and like maneuvers.

In assembly of the clutch mechanism at gear 38 the diameter of bore 97 is large enough to receive and pass the bent pawl 95 until section 96 is in slot 98, and then pin 99 is inserted to trap the pawl 95 in place.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a movie projector having a film gate, upper and lower continuously driven sprockets at opposite ends of the film gate, a reversible drive assembly adapted to be connected to supply and take-up reel spindles in said projector, means for continuously driving said sprockets comprising a first gear connected to the upper sprocket, an input gear for said reversible drive assembly, and means providing an optional friction drive or positively clutched drive between said gears.

2. In the movie projector defined in claim 1, said last means comprising a slidable rod on which said upper sprocket is mounted and to which said first gear is non-rotatably and slidably connected, and a manual knob on said rod adjacent the sprocket.

3. In a motion picture projector, a film sprocket, a rod on which said sprocket is mounted, means supporting said rod for axial sliding movement and for rotation, coaxial gears rotatable about said rod, means connecting one of said gears to rotate said sprocket, means providing a friction clutch between said gears, and means providing a disengageable positive clutch between said gears.

4. In the projector defined in claim 3, a sleeve in which said rod is slidably mounted and which is journalled for rotation about the sprocket axis, said one gear being fixed to said sleeve, and said rod being non-rotatably connected to said one gear.

5. In the projector defined in claim 3, means connecting the other of said gears to drive a film reel spindle drive selector mechanism.

6. Clutch mechanism comprising a shaft, a drive input member freely rotatable on said shaft so as to be capable of being driven in opposite directions, a first drive output member mounted on said shaft at one side of said input member and having a unidirectional drive clutch element, a second drive output member mounted on said shaft at the other side of said input member and having a unidirectional drive clutch element opposed to that of the first drive output member, and means rockably mounted on said input member selectively movable in response to the direction of rotation of said input member for engaging the clutch element on one or the other of said drive output members to connect said input member to selectively oppositely drive said output members.

7. The clutch mechanism defined in claim 6, wherein said means rockably mounted on the input member is a shiftable pawl and each clutch element on said output members is a ratchet adapted to be drive connected to the pawl.

8. In a motion picture projector, a rotatably mounted shaft, means drive connecting one end of said shaft to a supply reel spindle, a drive member for a take-up reel spindle rotatably mounted on said shaft, a gear rotatably mounted on said shaft between said members, means for selectively driving said gear in opposite directions, means responsive to the direction of rotation of said gear for automatically clutching said gear either to said shaft or to said drive member, said last-named means comprising a rockable pawl on the gear, coacting ratchets on the shaft and drive member, and means on the projector acting to rock said pawl between its opposite drive positions when the direction of gear rotation is changed.

9. In a clutch mechanism, a rotatable shaft, opposed ratchet members mounted on said shaft, one being rotatable and the other being non-rotatable with respect to the shaft, a gear rotatably mounted on said shaft between said ratchet members, a pawl rockably mounted on said gear on an axis parallel to said shaft and having projections at opposite sides of the gear for drive engagement with the respective ratchets, and control means operatively engaging said pawl for rocking said pawl to operatively engage one or the other of said ratchets depending on the direction of rotation of said gear.

10. In the clutch mechanism defined in claim 9, said pawl being a single length of metal and said projections being angularly related sections thereof.

11. In the clutch mechanism defined in claim 9, one end of the pawl being a crank and said control means comprising means for exerting drag on the crank end of said pawl.

12. In the clutch mechanism defined in claim 11, said means for exerting drag on the crank end of the pawl comprising a frictionally mounted relatively stationary member having a recess in which said crank end is rockably disposed.

13. In a motion picture projector having a film gate, rotatable supply and take-up spindles, a film advancing sprocket adjacent the film gate, a reversibly rotatable member, means for unidirectionally drive clutching said member to one or the other of said spindles depending upon the direction of rotation of said member, and power operated drive mechanism operably connected to selectively rotate said sprocket and said member in either direction comprising two drive elements, a friction clutch normally coupling said drive elements in drive relation, means drive connecting one of said drive elements to said sprocket, and means for selectively positively drive connecting said drive elements when said member is to be driven in the direction to drive a selected one of said spindles.

14. In the motion picture projector defined in claim 13, said selected spindle being the supply spindle and said drive elements being positively clutched when said supply spindle is rotated to rewind film thereupon.

15. In a motion picture projector, a first rotatable spindle adapted to mount a film reel, a second rotatable spindle adapted to mount a film reel, a rotatably mounted shaft, a gear rotatably mounted on said shaft, a first spindle drive member rotatably mounted on said shaft, a spindle drive member fixed on said shaft, means for selectively reversibly rotating said gear, and means carried by said gear automatically operative when the gear is rotated in one direction for drive connecting said gear to said first spindle drive member and automatically operative when said gear is rotated in the other direction for drive connecting said gear to said spindle drive member fixed on said shaft and disconnecting the drive from said gear to said first spindle drive member, said means for connecting the gear to drive the respective spindle drive members being a single clutch element rockably carried by said gear and automatically rocked to drive connect one or the other spindle drive members to the gear in response to the direction of gear rotation.

16. In a motion picture projector, a first rotatable spindle adapted to mount a film reel, a second rotatable spindle adapted to mount a film reel, a rotatably mounted shaft, a gear rotatably mounted on said shaft, a first spindle drive member rotatably mounted on said shaft, a second spindle drive member fixed on said shaft, means for selectively reversibly rotating said gear comprising drive gearing means optionally providing a friction clutch drive or a positive clutch drive in opposite directions of rotation of said gear, and means carried by said gear automatically operative when the gear is rotated in one direction for drive connecting said gear to said first spindle drive member and automatically operative when said gear is rotated in the other direction for drive connecting said gear to said spindle drive member fixed on said shaft and disconnecting the drive from said gear to said first spindle drive member.

References Cited in the file of this patent

UNITED STATES PATENTS

| | | |
|---|---|---|
| 1,004,978 | Bonine | Oct. 3, 1911 |
| 2,313,662 | Morgan et al. | Mar. 9, 1943 |
| 2,343,850 | Fairbanks et al. | Mar. 7, 1944 |
| 2,415,406 | Benfer | Feb. 11, 1947 |
| 2,624,214 | Arensberg | Jan. 6, 1953 |
| 2,666,594 | Jungjohann | Jan. 19, 1954 |
| 2,675,974 | Jones | Apr. 20, 1954 |
| 2,688,389 | Wittel et al. | Sept. 7, 1954 |
| 2,743,922 | Hoehn | May 1, 1956 |